(12) United States Patent
Saitou

(10) Patent No.: US 12,141,855 B2
(45) Date of Patent: Nov. 12, 2024

(54) STORE SYSTEM, INFORMATION PROCESSING APPARATUS, AND INFORMATION PROCESSING METHOD THEREFOR

(71) Applicant: TOSHIBA TEC KABUSHIKI KAISHA, Tokyo (JP)

(72) Inventor: Takahiro Saitou, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 858 days.

(21) Appl. No.: 17/122,899

(22) Filed: Dec. 15, 2020

(65) Prior Publication Data

US 2021/0256591 A1     Aug. 19, 2021

(30) Foreign Application Priority Data

Feb. 19, 2020     (JP) .................................. 2020-026252

(51) Int. Cl.
*G06Q 30/0601*     (2023.01)
*G06Q 20/20*     (2012.01)
(Continued)

(52) U.S. Cl.
CPC ....... *G06Q 30/0633* (2013.01); *G06Q 20/202* (2013.01); *G06Q 20/3224* (2013.01);
(Continued)

(58) Field of Classification Search
CPC ........... G06Q 30/0633; G06Q 30/0641; G06Q 20/202; G06Q 20/3224; G06Q 20/0457;
(Continued)

(56) References Cited

U.S. PATENT DOCUMENTS

2009/0261164 A1*  10/2009  Sato .................... G06Q 20/201
                                                       235/383

FOREIGN PATENT DOCUMENTS

JP     2008-003905 A     1/2008
JP     2012053763 A  *  3/2012
(Continued)

OTHER PUBLICATIONS de Sá, Benedita de Castro Girão Sanches. Understanding and Mapping the Retailing Employee Experience: A Qualitative Study. Universidade do Porto (Portugal) ProQuest Dissertations Publishing, 2019. (Year: 2019).*

(Continued)

*Primary Examiner* — Florian M Zeender
*Assistant Examiner* — Fawaad Haider
(74) *Attorney, Agent, or Firm* — Kim & Stewart LLP

(57) ABSTRACT

According to an embodiment, an information processing apparatus registers, upon input of identification information of a commodity to be purchased via a mobile terminal, data of the commodity to be purchased identified by the identification information in a list. The information processing apparatus notifies, upon receiving an instruction to execute checkout from the mobile terminal, the mobile terminal of a checkout code for specifying the list. The information processing apparatus outputs, upon input of the code in a checkout machine, the list specified by the code to the checkout machine. The information processing apparatus counts the number of codes that are notified to the mobile terminal but not input in the checkout machine. The information processing apparatus executes processing for notifying the user of the mobile terminal of the count value.

10 Claims, 20 Drawing Sheets

(51) Int. Cl.
*G06Q 20/32* (2012.01)
*G07C 11/00* (2006.01)
*G07G 1/00* (2006.01)

(52) U.S. Cl.
CPC ....... *G06Q 30/0641* (2013.01); *G07G 1/0054* (2013.01); *G07G 1/0081* (2013.01); *G07C 2011/04* (2013.01)

(58) Field of Classification Search
CPC .... G06Q 20/18; G06Q 20/204; G06Q 20/208; G06Q 20/322; G06Q 20/326; G06Q 20/3276; G06Q 20/20; G07G 1/0054; G07G 1/0081; G07G 1/0009; G07G 1/14; G07G 1/12; G07G 1/0018; G07C 2011/04; G06F 16/2462
USPC .......................................................... 705/16
See application file for complete search history.

(56) References Cited

FOREIGN PATENT DOCUMENTS

| | | | | |
|---|---|---|---|---|
| JP | 2017167662 | A | * | 9/2017 |
| JP | 2018060408 | A | * | 4/2018 |
| JP | 2019-152923 | A | | 9/2019 |
| JP | 2019-153074 | A | | 9/2019 |
| WO | 2016/136110 | A1 | | 9/2016 |

OTHER PUBLICATIONS

Notice of Reasons for Refusal mailed Aug. 15, 2023 in corresponding Japanese Patent Application No. 2020-026252, 6 pages (with Translation).

* cited by examiner

331

| CHECKOUT MACHINE NUMBER | STATUS |
|---|---|
| 1. | |
| 2. | |
| ⋮ | ⋮ |

Fig.6

STORE SYSTEM, INFORMATION PROCESSING APPARATUS, AND INFORMATION PROCESSING METHOD THEREFOR

CROSS-REFERENCE TO RELATED APPLICATIONS

This application is based upon and claims the benefit of priority from the prior Japanese Patent Application No. 2020-026252, filed on Feb. 19, 2020, the entire contents of which are incorporated herein by reference.

FIELD

Embodiments described herein generally relate to a store system, an information processing apparatus, and an information processing method therefor.

BACKGROUND

Various store systems have been recently devised in which a customer registers a commodity to be purchased by using a mobile terminal (cart terminal, smartphone, or the like) at the time of shipping while going around a sales floor, thus simplifying the registration operation of the commodity to be purchased at the time of checkout.

As an example, in the store system, a customer who uses the mobile terminal, i.e., a so-called user, touches a checkout button displayed on a touch panel of the mobile terminal when the registration of the commodity to be purchased is completed. A checkout bar code is then displayed on the touch panel, and thus the user moves to the location where a checkout machine is installed. When the user causes a scanner of the checkout machine to read the checkout bar code, checkout processing is started.

In such a store system, when the user moves to the location where the checkout machine is installed, the location may be congested with users who intend to perform checkout. Thus, there is a concern that a checkout standby state may occur.

BRIEF DESCRIPTION OF THE DRAWINGS

FIG. 6 is a diagram schematically showing an example of a checkout machine status table according to the embodiment.

DETAILED DESCRIPTION

Figure 1:
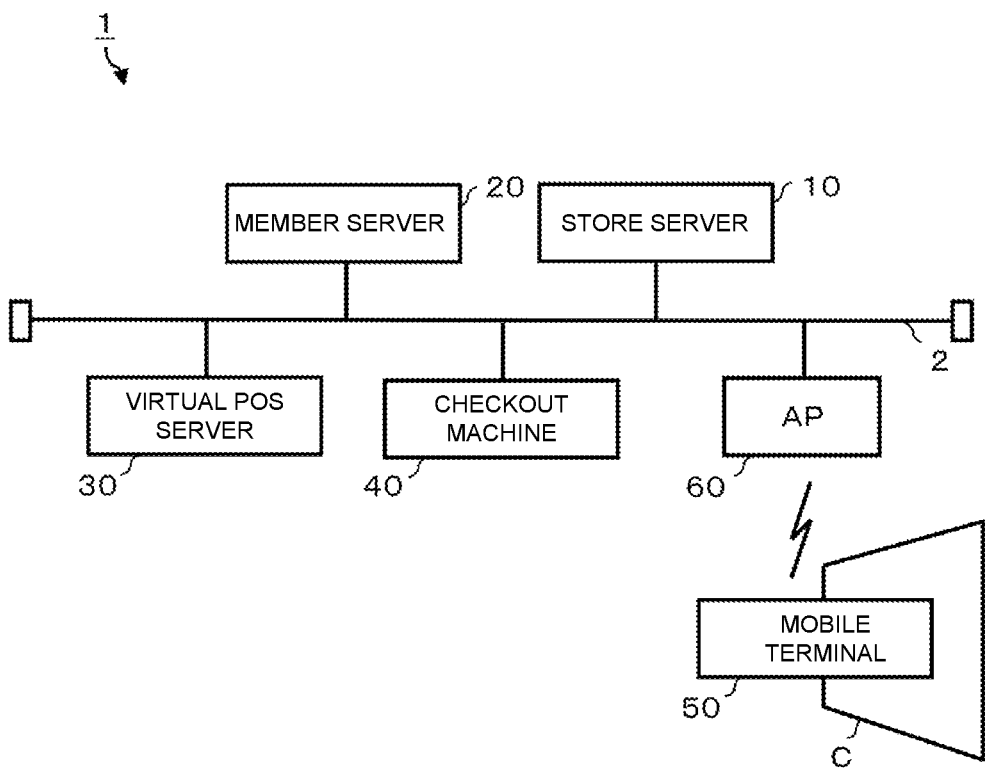
FIG. 1 is a diagram schematically showing a store system according to an embodiment.

According to one embodiment, an information processing apparatus is communicably connected to a mobile terminal that is carried by a user and performs registration processing of registering identification information of a commodity to be purchased by the user, and a plurality of checkout machines capable of performing checkout processing for the registered commodity to be purchased. The information processing apparatus includes a communication interface, a memory, a storage device, and a processor. The communication interface communicates with the mobile terminal and the plurality of checkout machines. The memory stores a purchase registration list including data of the commodity to be purchased identified by the identification information, the data being registered for each user. The storage device includes a counter that stores a count value of the number of users waiting for the checkout processing. The processor registers, upon receiving the identification information of the commodity to be purchased from the mobile terminal via the communication interface, the data of the commodity to be purchased identified by the received identification information in the purchase registration list of the user of the mobile terminal that is a transmission source of the identification information. The processor notifies, upon receiving a checkout execution command for instructing execution of checkout for the commodity to be purchased from the mobile terminal via the communication interface, the mobile terminal of a checkout code for specifying the purchase registration list of the user of the mobile terminal that is the transmission source of the checkout execution command. The processor outputs, upon receiving a list inquiry command including the checkout code from one of the checkout machines to which the checkout code is input via the mobile terminal, the purchase registration list specified by the checkout code included in the list inquiry command to the checkout machine that is the transmission source of the list inquiry command. The processor counts the number of checkout codes that are notified to the mobile terminal but not received from the checkout machines and stores the count value in the counter of the storage device. Further, the processor transmits the count value of the counter to the mobile terminal via the communication interface.

Hereinafter, one embodiment will be described with reference to the drawings. In this embodiment, a tablet terminal attached to a shopping cart, i.e., a so-called cart terminal, is used as a mobile terminal. The same reference symbols in the drawings will denote the same or similar portions.

FIG. 1 is a diagram schematically showing a schematic configuration of a store system 1 according to an embodiment.

The store system 1 includes a store server 10, a member server 20, a virtual point-of-sale (POS) server 30, a checkout machine 40, a mobile terminal 50, and an access point 60. The store server 10, the member server 20, the virtual POS server 30, the checkout machine 40, and the access point 60 are connected to a network 2 such as a local area network (LAN).

The mobile terminal 50 is a device that allows a user, i.e., a purchaser, to perform self-input of data associated with registration of a commodity that the user intends to purchase, that is, a commodity to be purchased. The mobile terminal 50 is provided to a shopping cart C. Hereinafter, the shopping cart C will be simply referred to as a cart C. A plurality of carts C are each provided with the mobile terminal 50. The cart C is an example of a conveyance body that conveys a commodity to be purchased of a user who is a user of the cart C.

Figure 2:
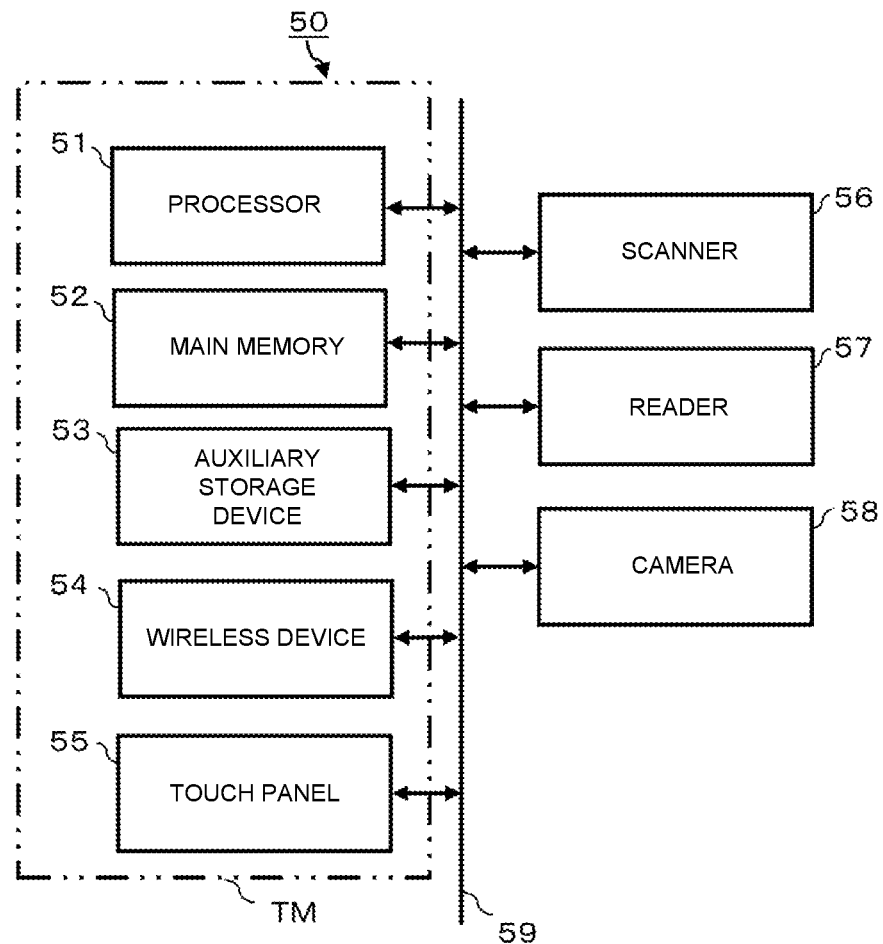
FIG. 2 is a block diagram showing a main circuit configuration of a mobile terminal according to the embodiment.

The mobile terminal 50 includes a wireless device 54 (see FIG. 2). The mobile terminal 50 performs wireless communication with the access point 60. The access point 60 relays communication between each device connected to the network 2 and the mobile terminal 50. That is, the access point 60 relays communication between the mobile terminal 50 and the store server 10, the member server 20, the virtual POS server 30, and the checkout machine 40. FIG. 1 shows one access point 60, but two or more access points 60 may be provided depending on the size of the store or the like.

The checkout machine 40 is a device that allows a store clerk or a user to perform checkout for purchased commodities. The number of checkout machines 40 is not particularly limited.

The store server 10 manages a commodity database. The commodity database stores a commodity data record that describes data of commodities that are on sale in the store. The commodity data record includes items such as a commodity code, a commodity name, and a price. The commodity code is commodity identification data that is set for each commodity in order to individually identify the commodity. Each commodity is usually accompanied by a bar code indicating the commodity code.

The member server 20 manages a member database. The member database stores a member data record that describes member data for each member. The member data record includes a member ID, a name, sex, a mail address, and the like. The member ID is an identification code of the member.

The virtual POS server 30 cooperates with the mobile terminal 50 to cause the mobile terminal 50 to operate so as to achieve the function of a POS terminal.

FIG. 2 is a block diagram showing a main circuit configuration of the mobile terminal 50. The mobile terminal 50 includes a processor 51, a main memory 52, an auxiliary storage device 53, a wireless device 54, a touch panel 55, a scanner 56, a reader 57, a camera 58, and a system transmission path 59. The system transmission path 59 includes an address bus, a data bus, a control signal line, and the like. In the mobile terminal 50, the processor 51, the main memory 52, the auxiliary storage device 53, the wireless device 54, the touch panel 55, the scanner 56, the reader 57, and the camera 58 are connected to the system transmission path 59. The mobile terminal 50 includes the processor 51, the main memory 52, the auxiliary storage device 53, and the system transmission path 59 connecting those components to constitute a computer.

The processor 51 corresponds to a central portion of the computer. The processor 51 controls each unit of the mobile terminal 50 so as to achieve various functions thereof according to an operating system or application program. The processor 51 is, for example, a central processing unit (CPU).

The main memory 52 corresponds to the main storage portion of the computer. The main memory 52 includes a non-volatile memory area and a volatile memory area. The main memory 52 stores the operating system or application program in the non-volatile memory area. The main memory 52 may store, in the non-volatile or volatile memory area, the data to be used for the processor 51 to perform processing for controlling each unit. The volatile memory area of the main memory 52 is used as a work area in which data is appropriately rewritten by the processor 51. The non-volatile memory area is, for example, a read only memory (ROM). The volatile memory area is, for example, a random access memory (RAM).

The auxiliary storage device 53 corresponds to an auxiliary storage portion of the computer. For example, an electric erasable programmable read-only memory (EE-PROM), a hard disc drive (HDD), a solid-state drive (SSD), or the like may be used as the auxiliary storage device 53. The auxiliary storage device 53 stores data to be used for the processor 51 to perform various types of processing, data generated in processing by the processor 51, and the like. The auxiliary storage device 53 may store the application program described above.

The application program stored in the main memory 52 or the auxiliary storage device 53 includes a control program described for information processing executed by the mobile terminal 50. The method of installing the control program in the main memory 52 or the auxiliary storage device 53 is not particularly limited. The control program may be recorded on a removable recording medium or may be distributed through communication over a network, to be installed in the main memory 52 or the auxiliary storage device 53. The recording medium may have any form such as a CD-ROM or a memory card, as long as the recording medium can store a program and an apparatus can read it.

The wireless device 54 wireless data performs communication with the access point 60 according to a wireless communication protocol.

The touch panel 55 is a device serving as both of an input device and a display device of the mobile terminal 50. The touch panel 55 detects a touch position with respect to a displayed image and outputs information of the touch position to the processor 51.

The scanner 56 reads a code symbol such as a bar code or a two-dimensional data code provided to the commodity. A code symbol indicating the commodity code is provided to the commodity. The scanner 56 outputs data of the read code symbol to the processor 51. The scanner 56 may be of a type that reads a code symbol by scanning with a laser beam, or may be of a type that reads a code symbol from an image captured by an imaging device.

The reader 57 reads data recorded on the recording medium and outputs the read data to the processor 51. The reader 57 is a magnetic card reader when the recording medium is a magnetic card, and is an IC card reader when the recording medium is a contact IC card. For a recording medium using radio frequency identification (RFID) such as a contactless IC card or a smartphone, an RFID reader is used as the reader 57.

The camera 58 is provided to the cart C such that a basket placed in a basket receiving portion of the cart C can be imaged from above. The camera 58 is for monitoring whether or not the user who is a user of the cart C has correctly put a commodity to be purchased in the basket.

In the mobile terminal 50 including the above-mentioned circuit components, the processor 51, the main memory 52, the auxiliary storage device 53, the wireless device 54, and the touch panel 55 constitute a tablet terminal TM. The tablet terminal TM is electrically connected with the scanner 56, the reader 57, and the camera 58, thus constituting the mobile terminal 50. In other words, as shown in FIG. 2, the mobile terminal 50 includes the tablet terminal TM described above, the scanner 56, the reader 57, and the camera 58.

Figure 3:
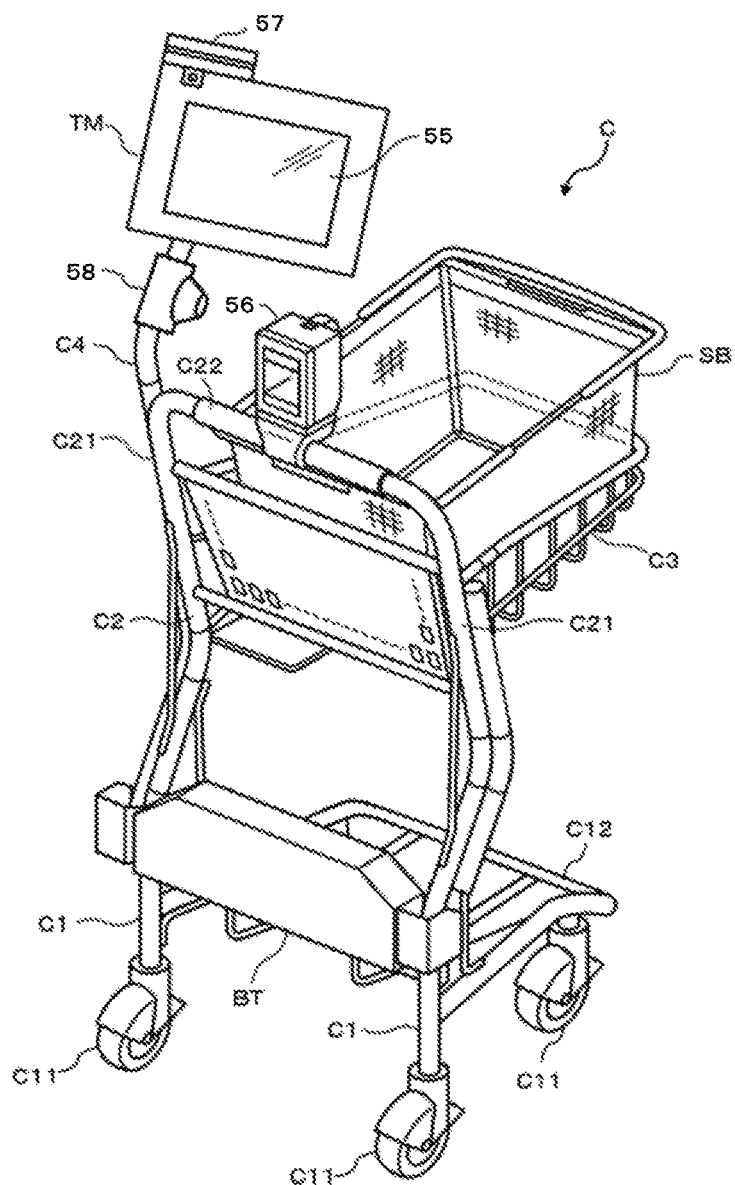
FIG. 3 is a perspective view showing an example of a shopping cart including the mobile terminal according to the embodiment.

FIG. 3 is a perspective view showing an example of the cart C including the mobile terminal 50. The cart C includes a caster portion C1 for movement, a handle frame portion C2, and a basket receiving portion C3. The caster portion C1 includes four wheels C11 for smoothly moving on the floor surface. The caster portion C1 further includes a receiving portion C12 for placing a large load that does not fit in a shopping basket SB. The handle frame portion C2 includes a pair of vertical frames C21 and C21 vertically provided above the rear wheels of the caster portions C1, and a handle bar C22 connecting the upper ends of those vertical frames C21 and C21. The basket receiving portion C3 is provided at an intermediate portion of the handle frame portion C2 to face forward. The cart C can hold the shopping basket SB of a store on the basket receiving portion C3. The shopping basket SB is for accommodating commodities.

The scanner 56 is provided at an intermediate portion of the handle bar C22. The scanner 56 is attached to the handle bar C22 such that a reading window thereof faces the near side. The near side is where the user stands while holding the handle bar C22 and pressing the cart C.

A pole C4 is attached to one of the vertical frames C21 and C21. The tip of the pole C4 is located above the handle bar C22. The tablet terminal TM is attached to the tip of the pole C4 with the screen of the touch panel 55 facing the user. The reader 57 is attached to the tablet terminal TM such that a card slit thereof faces the near side. The reader 57 shown in FIG. 3 is, for example, a magnetic card reader. The camera 58 is attached to an intermediate portion of the pole C4 so as to image the entire shopping basket SB placed in the basket receiving portion C3 from above.

A battery BT is attached between the vertical frames C21 and C21 on the lower end of the handle frame portion C2. The battery BT is a driving power source for the tablet terminal TM, the scanner 56, the reader 57, and the camera 58.

Figure 4:
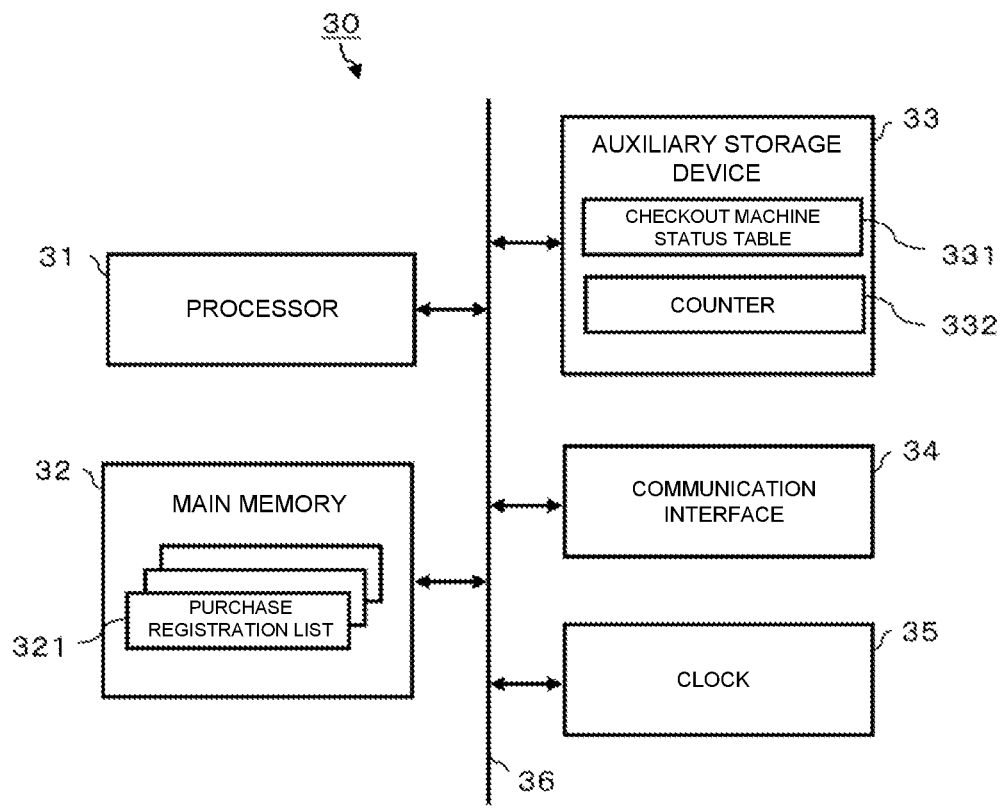
FIG. 4 is a block diagram showing a main circuit configuration of a virtual point-of-sale (POS) server according to the embodiment.

FIG. 4 is a block diagram showing a main circuit configuration of the virtual POS server 30. The virtual POS server 30 includes a processor 31, a main memory 32, an auxiliary storage device 33, a communication interface 34, a clock 35, and a system transmission path 36. The system transmission path 36 includes an address bus, a data bus, a control signal line, and the like. In the virtual POS server 30, the processor 31, the main memory 32, the auxiliary storage device 33, the communication interface 34, and the clock 35 are connected to the system transmission path 36. The virtual POS server 30 includes the processor 31, the main memory 32, the auxiliary storage device 33, and the system transmission path 36 connecting those components to constitute a computer.

The processor 31 corresponds to a central portion of the computer. The processor 31 controls each unit of the virtual POS server 30 so as to achieve various functions thereof according to an operating system or an application program. The processor 31 is, for example, a CPU.

The main memory 32 corresponds to the main storage portion of the computer. The main memory 32 includes a non-volatile memory area and a volatile memory area. The main memory 32 stores the operating system or application program in the non-volatile memory area. The main memory 32 may store, in the non-volatile or volatile memory area, the data to be used for the processor 31 to perform processing for controlling each unit. The volatile memory area of the main memory 32 is used as a work area in which data is appropriately rewritten by the processor 31. The non-volatile memory area is, for example, a ROM. The volatile memory area is, for example, a RAM.

The auxiliary storage device 33 corresponds to an auxiliary storage portion of the computer. For example, an EEPROM, an HDD, an SSD, or the like may be used as the auxiliary storage device 33. The auxiliary storage device 33 stores data to be used for the processor 31 to perform various types of processing, data generated in processing by the processor 31, and the like. The auxiliary storage device 33 may store the application program described above.

The communication interface 34 is connected to the network 2. The communication interface 34 performs data communication with other devices connected via the network 2 according to a communication protocol.

The clock 35 functions as a time information source of the virtual POS server 30. The processor 31 measures the current date and time on the basis of the time information measured by the clock 35.

The virtual POS server 30 having such a configuration uses a part of the volatile memory area of the main memory 32 as an area for creating a purchase registration list 321. The virtual POS server 30 creates a plurality of purchase registration lists 321 in this area.

Figure 5:
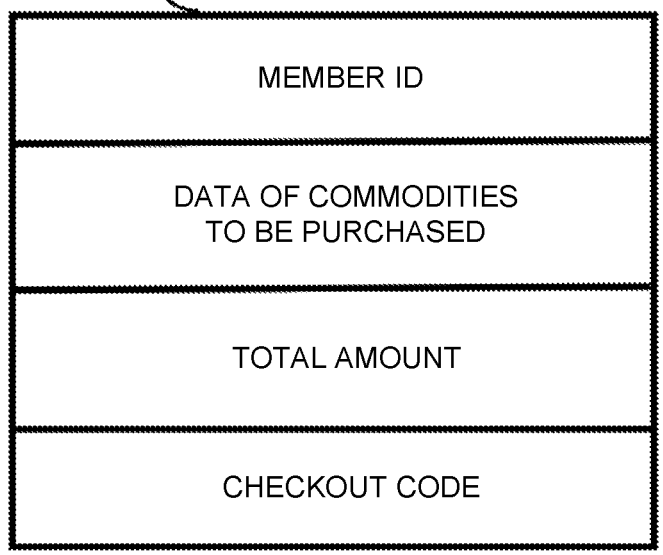
FIG. 5 is a diagram schematically showing an example of a purchase registration list according to the embodiment.

FIG. 5 is a diagram schematically showing an example of the purchase registration list 321. As shown in FIG. 5, the purchase registration list 321 includes areas for storing a member ID, data of commodities to be purchased, a total amount, and a checkout code. The checkout code will be described later. The data of commodities to be purchased includes a commodity code, a commodity name, a price, a purchase count, a purchase amount, and the like of a commodity to be purchased by the user. The purchase count is the number of commodities to be purchased, which are identified by the commodity codes. The purchase amount is the total of the prices based on the purchase count. The total amount is the total of the purchase amounts included in the data of commodities to be purchased. The purchase registration list 321 is created in association with the member ID of the mobile terminal 50.

The virtual POS server 30 having such a configuration stores a checkout machine status table 331 (see FIG. 6) and a counter 332 in a part of the storage area of the auxiliary storage device 33. The counter 332 will be described later.

Figure 6:
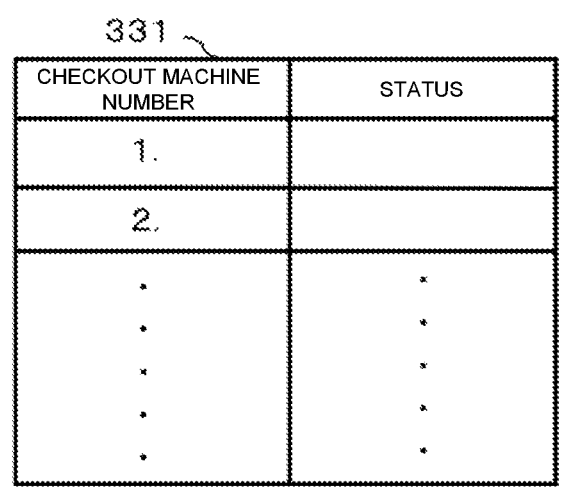

FIG. 6 is a diagram schematically showing an example of the checkout machine status table 331. As shown in FIG. 6, the checkout machine status table 331 describes the status of each checkout machine 40 in the order of a series of checkout machine numbers. The checkout machine number is identification information assigned to each checkout machine 40 in order to individually identify the checkout machine 40. The status is information indicating a state of the checkout machine 40 identified by a corresponding checkout machine number. The state of the checkout machine 40 includes "idle" and "in checkout". "Idle" is a state from the end of the checkout of the last user to the start of the checkout of the next user. "In checkout" is a state from the start to the end of the checkout of one user. Note that the state of the checkout machine 40 is not limited to "idle" and "in checkout".

Figure 7:
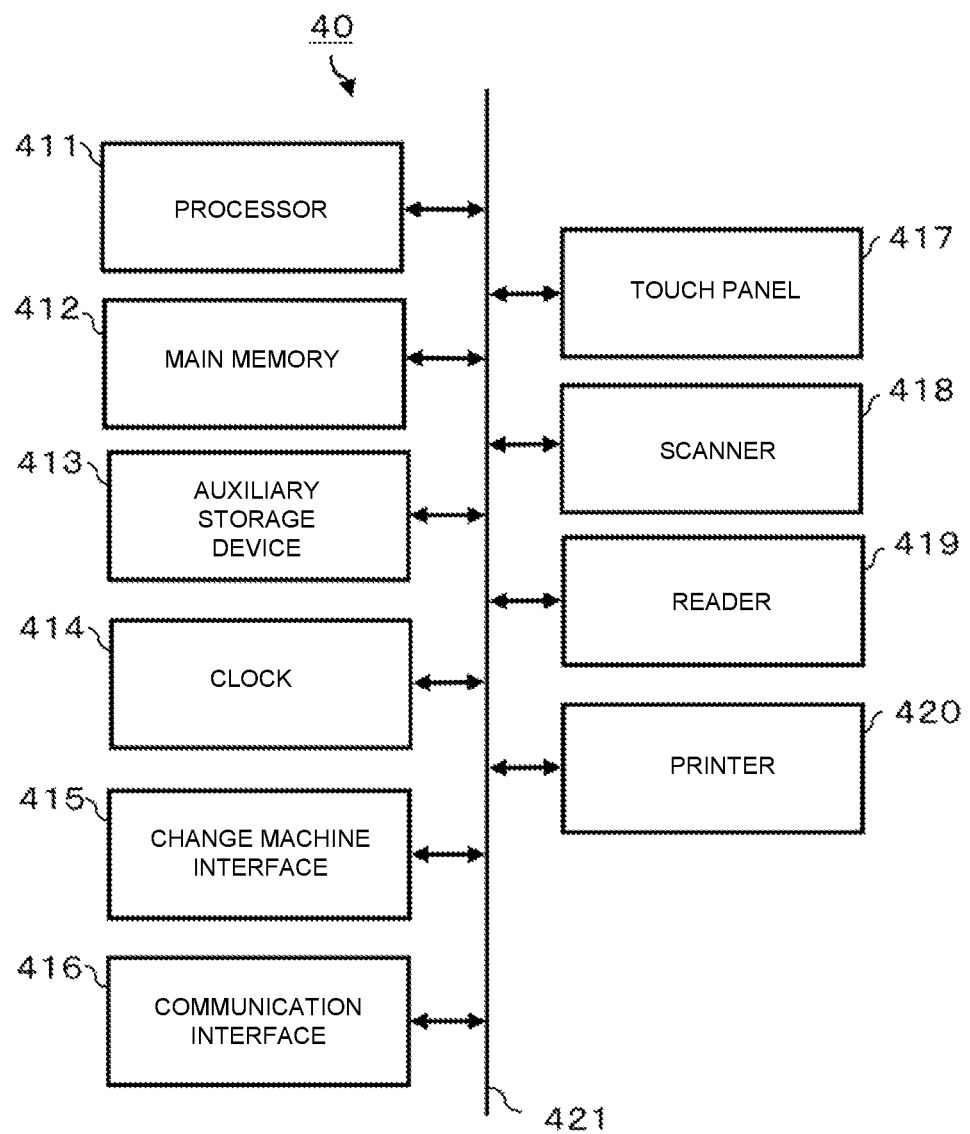
FIG. 7 is a block diagram showing a main circuit configuration of a checkout machine according to the embodiment.

FIG. 7 is a block diagram showing a main circuit configuration of the checkout machine 40. The checkout machine 40 includes a processor 411, a main memory 412, an auxiliary storage device 413, a clock 414, a change machine interface 415, a communication interface 416, a touch panel 417, a scanner 418, a reader 419, a printer 420, and a system transmission path 421. The system transmission path 421 includes an address bus, a data bus, a control signal line, and the like. The system transmission path 421 interconnects the processor 411, the main memory 412, the auxiliary storage device 413, the clock 414, the change machine interface 415, the communication interface 416, the touch panel 417, the scanner 418, the reader 419, and the printer 420. The processor 411, the main memory 412, and the auxiliary storage device 413 are connected to one another by the system transmission path 421, to constitute a computer of the checkout machine 40.

The processor 411 corresponds to a central portion of the computer. The processor 411 controls each unit of the checkout machine 40 so as to achieve various functions thereof according to an operating system or an application program. The processor 411 is, for example, a CPU.

The main memory 412 corresponds to the main storage portion of the computer. The main memory 412 includes a non-volatile memory area and a volatile memory area. The main memory 412 stores the operating system or application program in the non-volatile memory area. The main memory 412 may store, in the non-volatile or volatile memory area, the data to be used for the processor 411 to perform processing for controlling each unit. The volatile memory area of the main memory 412 is used as a work area in which data is appropriately rewritten by the processor 411. The non-volatile memory area is, for example, a ROM. The volatile memory area is, for example, a RAM.

The auxiliary storage device 413 corresponds to an auxiliary storage portion of the computer. For example, an EEPROM, an HDD, an SSD, or the like may be used as the auxiliary storage device 413. The auxiliary storage device 413 stores data to be used for the processor 411 to perform various types of processing, data generated in processing by the processor 411, and the like. The auxiliary storage device 413 may store the application program described above.

The application program stored in the main memory 412 or the auxiliary storage device 413 includes a control program described for information processing executed by the checkout machine 40. The method of installing the control program in the main memory 412 or the auxiliary storage device 413 is not particularly limited. The control 1 program may be recorded on a removable recording medium or may be distributed through communication over a network, to be installed in the main memory 412 or the auxiliary storage device 413. The recording medium may have any form such as a CD-ROM or a memory card, as long as the recording medium can store a program and an apparatus can read it.

The clock 414 functions as a time information source of the checkout machine 40. The processor 411 measures the current date and time on the basis of the time information measured by the clock 414.

The change machine interface 415 performs data communication with an automatic change machine. The change machine interface 415 receives, from the automatic change machine, data of the input amount of money, data of the number of collected coins and bills, and the like. The change machine interface 415 transmits the change data to the automatic change machine.

The communication interface 416 is connected to the network 2. The communication interface 416 performs data communication with other devices connected via the network 2 according to a communication protocol.

The touch panel 417 is a device serving as both of an input device and a display device of the checkout machine 40. The touch panel 417 detects a touch position with respect to a displayed image and outputs information of the touch position to the processor 411.

The scanner 418 is an example of a reader that reads a code symbol such as a bar code or a two-dimensional code. The scanner 418 may be of a type that reads a code symbol by scanning with a laser beam, or may be of a type that reads a code symbol from an image captured by an imaging device.

The reader 419 reads data recorded on the recording medium and outputs the read data to the processor 411. The reader 419 is a magnetic card reader when the recording medium is a magnetic card, and is an IC card reader when the recording medium is a contact IC card. For a recording medium using RFID such as a contactless IC card or a smartphone, an RFID reader is used as the reader 419.

The printer 420 issues a receipt by printing various character strings, images, or the like on a receipt sheet. As this type of printer 420, for example, a thermal printer, a dot impact printer, or the like can be used. The printer 420 functions as a printing device of the checkout machine 40.

Figure 8:
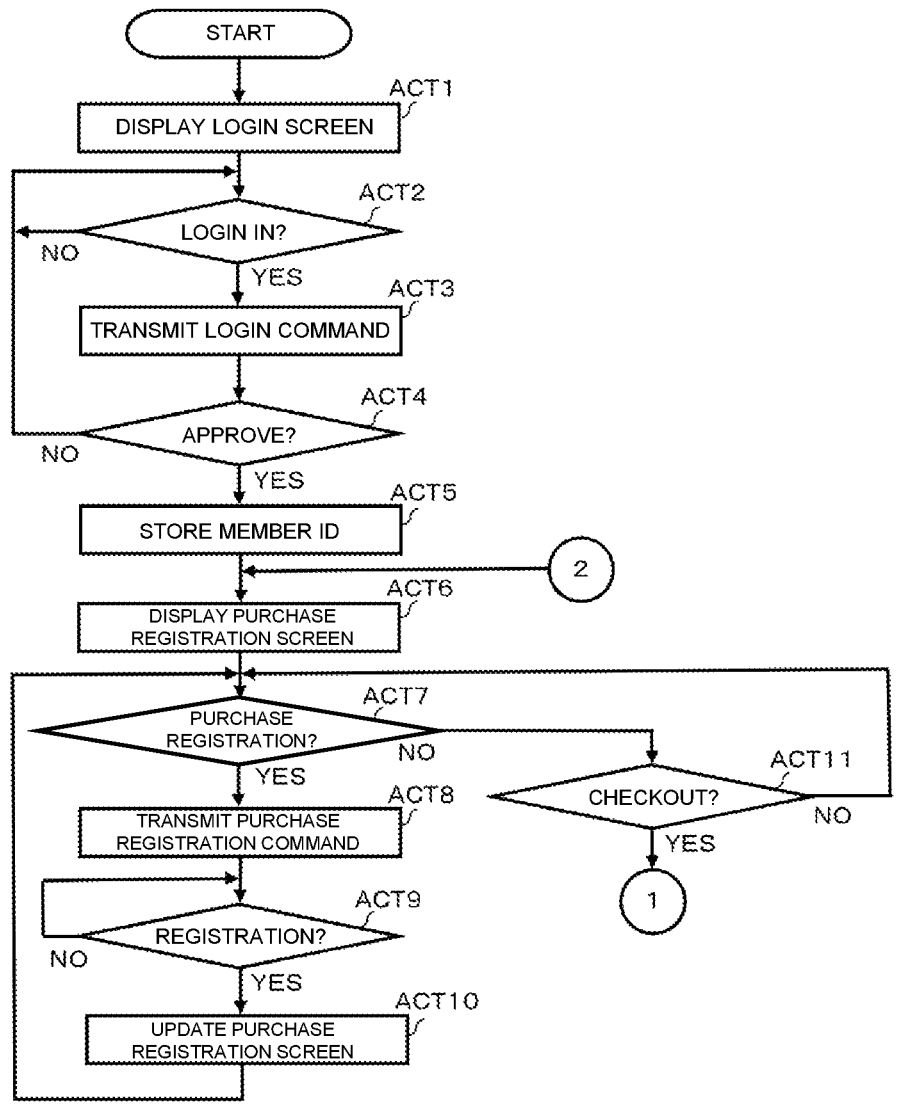
FIG. 8 is a flowchart showing information processing performed by a processor of the mobile terminal according to the embodiment.
Figure 9:
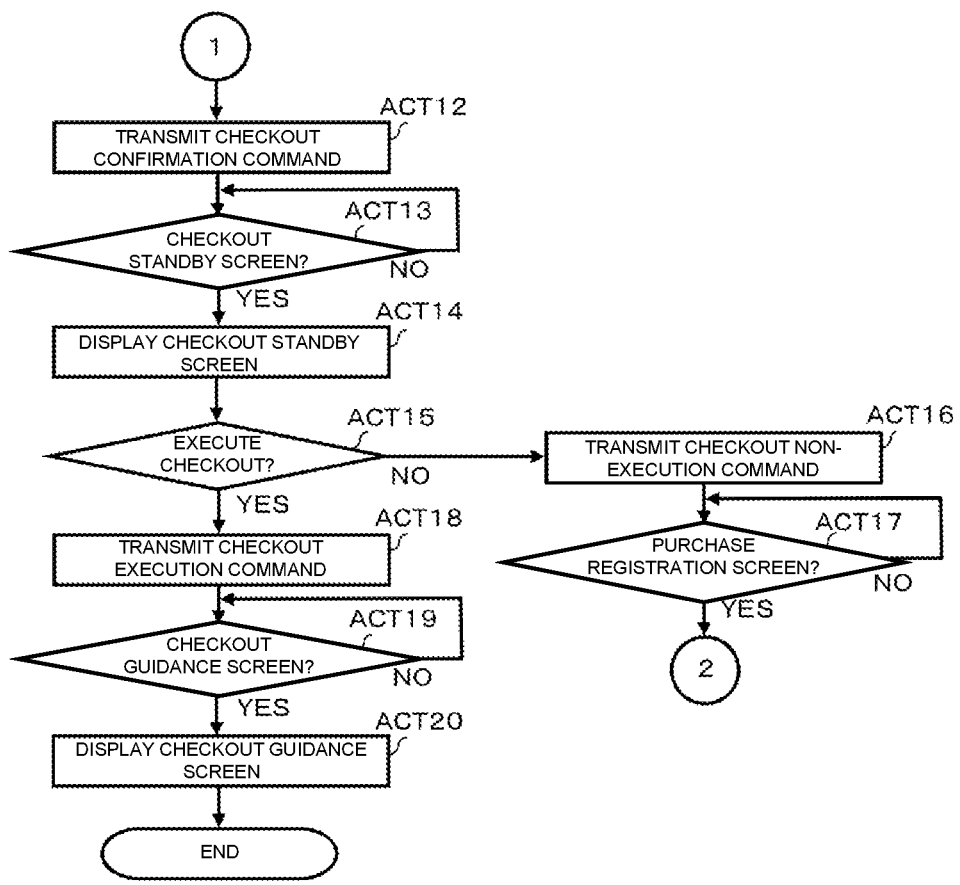
FIG. 9 is a flowchart showing information processing performed by the processor of the mobile terminal according to the embodiment.

FIGS. 8 and 9 are flowcharts showing a control method performed by the processor 51 of the mobile terminal 50. FIGS. 10 to 14, 16 and 17 are flowcharts showing information processing performed by the processor 31 of the virtual POS server 30. FIG. 15 is a flowchart showing information processing performed by the processor 411 of the checkout machine 40.

Hereinafter, with reference to those drawings, description will be given on a main operation of the store system 1 in the case where a user who is a member performs self-registration to self-payment for the commodities to be purchased by using the mobile terminal 50 of the cart C. Note that the operation to be described below is an example. If similar results are obtained, the procedure is not particularly limited.

First, a user who performs shopping using the cart C touches the touch panel 55. When the touch panel 55 is touched, the processor 51 in the idle state is activated. The processor 51 starts the information processing shown in the flowchart of FIG. 8.

In ACT1, the processor 51 causes the touch panel 55 to display a login screen. The login screen is for instructing a member to log in. A user who is the member has a membership card in which a member code of the user is recorded. The user confirms the login screen and causes the reader 57 to read the data of the membership card. When the data of the membership card is read by the reader 57, the data of the membership card is given to the processor 51.

The processor 51, which has caused the touch panel 55 to display the login screen, waits for the login in ACT2. When receiving the data from the reader 57 and confirming that the data is data of the membership card including a member ID, the processor 51 determines that the login has been performed (YES in ACT2). The processing of the processor 51 then proceeds to ACT3.

In ACT3, the processor 51 controls the wireless device 54 to transmit a login command to the virtual POS server 30. Through this control, the wireless device 54 wirelessly transmits a login command. The login command is received at the access point 60 and transmitted to the virtual POS server 30 via the network 2. The login command includes the member ID of the membership card read by the reader 57.

Figure 10:
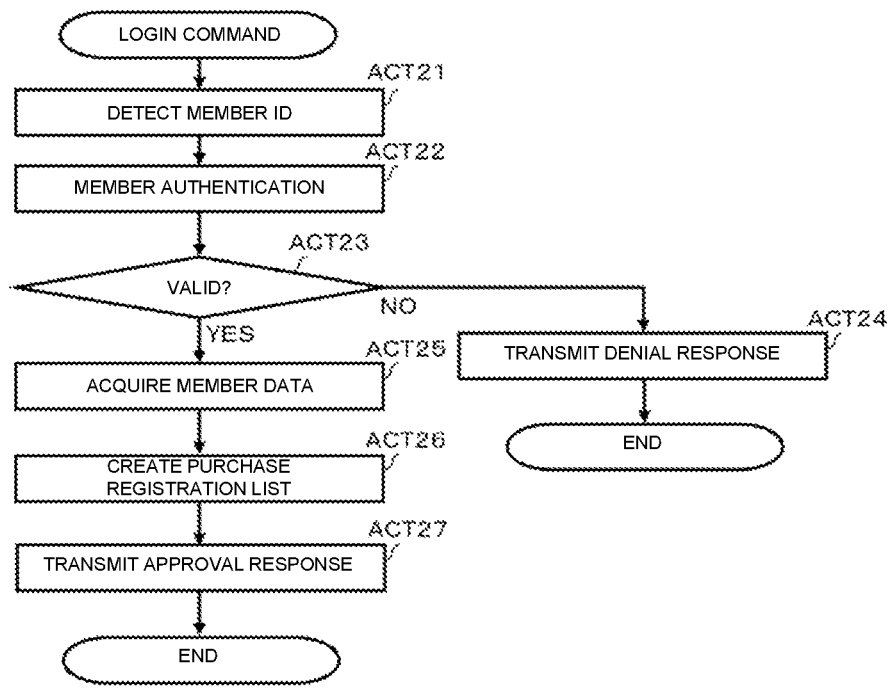
FIG. 10 is a flowchart showing information processing performed by a processor of the virtual POS server according to the embodiment.

The processor 31 of the virtual POS server 30 receives the login command and then starts command reception processing shown in the flowchart of FIG. 10.

In ACT21, the processor 31 of the virtual POS server 30 detects the member ID from the login command transmitted from the mobile terminal 50. In ACT22, the processor 31 authenticates the member identified by the member ID. Specifically, the processor 31 inquires of the member server 20 whether a member data record including the member ID exists in the member database. As a result, when receiving from the member server 20 a response indicating that a corresponding member data record exists in the member database, the processor 31 determines that an authentication result of the member authentication is valid. On the other hand, when receiving from the member server 20 a response indicating that a corresponding member data record does not exist in the member database, the processor 31 determines that an authentication result of the member authentication is invalid.

In ACT23, the processor 31 determines the authentication result of the member authentication. If it is determined that the authentication result of the member authentication is invalid (NO in ACT23), the processing of the processor 31 proceeds to ACT24. In ACT24, the processor 31 controls the communication interface 34 to transmit a denial response command to the mobile terminal 50. Through this control, the communication interface 34 transmits a denial response command. The denial response command is wirelessly transmitted from the access point 60 via the network 2 and received by the mobile terminal 50 that is the transmission source of the login command.

If it is determined that the authentication result of the member authentication is valid (YES in ACT23), the processing of the processor 31 proceeds to ACT25. In ACT25, the processor 31 requests the member server 20 for the member data of the member identified by the member ID, and acquires the member data including the member ID from the member server 20.

In ACT26, the processor 31 creates a purchase registration list 321 in the main memory 32. The processor 31 then writes the member ID, which is included in the login command, to the purchase registration list 321 (see FIG. 5).

In ACT27, the processor 31 controls the communication interface 34 to transmit an approval response command to the mobile terminal 50. Through this control, the communication interface 34 transmits an approval response command. The approval response command is wirelessly transmitted from the access point 60 via the network 2 and received by the mobile terminal 50 that is the transmission source of the login command.

As described above, the virtual POS server 30 receives a login command and transmits a denial or approval response command in ACT24 or ACT27 to the mobile terminal 50 that is the transmission source of the login command. When finishing transmitting any of the response commands, the processor 31 of the virtual POS server 30 terminates the login command reception processing. Note that the processing for the login command may be executed by the member server 20. In this case, the member server 20 requests the virtual POS server 30 to create the purchase registration list 321.

Now, the description of FIG. 8 will be continued. The processor 51 of the mobile terminal 50 controls the transmission of the login command in ACT3 described above and then waits for a response command from the virtual POS server 30 in ACT4. If it is determined that the denial response command has been received from the virtual POS server 30 (NO in ACT4), the processing of the processor 51 returns to ACT2. Thus, the user will log in again.

If it is determined that the approval response command has been received from the virtual POS server 30 (YES in ACT4), the processing of the processor 51 proceeds to ACT5. In ACT5, the processor 51 stores the member ID included in the approval response command in the main memory 52. In addition, in ACT6, the processor 51 causes the touch panel 55 to display a purchase registration screen SC1 (see FIG. 18).

Figure 18:
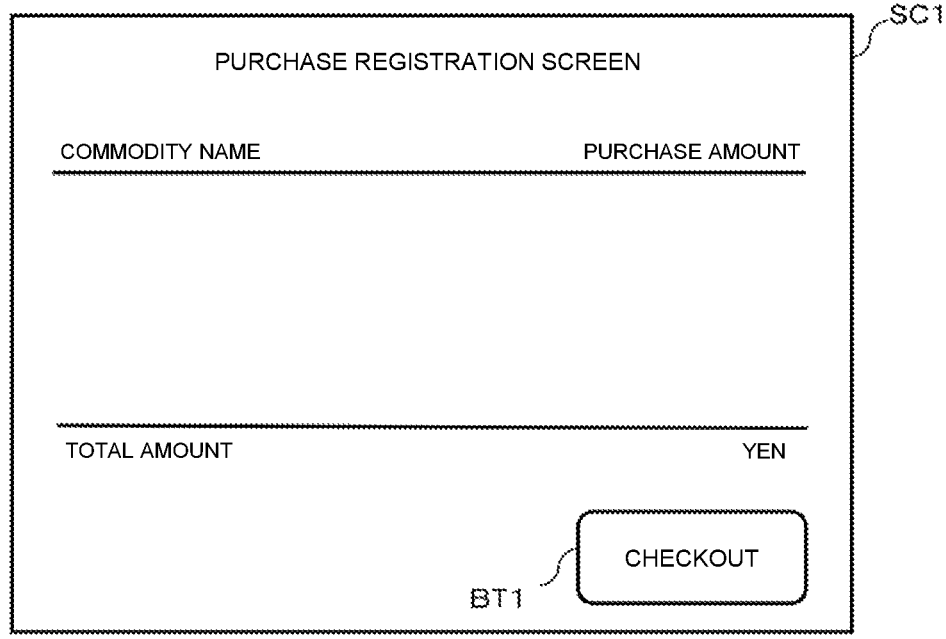
FIG. 18 is a diagram schematically showing an example of a purchase registration screen displayed on the mobile terminal according to the embodiment.

FIG. 18 is a diagram schematically showing an example of the purchase registration screen SC1. As shown in FIG. 18, an area for displaying a commodity name, a purchase amount, and a total amount of commodities to be registered and purchased is displayed on the purchase registration screen SC1. In addition, an image of a checkout button BT1 for instructing checkout is displayed.

The user confirms the purchase registration screen SC1, then goes around the sales floor and accommodates commodities to be purchased in the cart C. For example, the user puts a commodity to be purchased in the shopping basket SB placed in the basket receiving portion C3. Before placing the commodity to be purchased in the shopping basket SB, the user operates the scanner 56 to read a code symbol provided to the commodity. When the code symbol is read by the scanner 56, the commodity code indicated by the code symbol is input to the mobile terminal 50. That is, a purchase registration of the commodity identified by the commodity code is performed.

Note that some commodities such as fresh foods may have no code symbols. Although not shown, in the case where a commodity to be purchased has no code symbol, the user touches a commodity button corresponding to the commodity to be purchased, among commodity buttons displayed on the screen of the touch panel 55. When a commodity button is touched, a commodity code of a commodity corresponding to the commodity button is input to the mobile terminal 50. That is, a purchase registration of the commodity identified by the commodity code is performed.

Now, the description of FIG. 8 will be continued. After completing the processing in ACT5 and ACT6, the processor 51 of the mobile terminal 50 determines whether a purchase registration has been performed or not in ACT7. If it is determined that a purchase registration has been performed (YES in ACT7), the processing of the processor 51 proceeds to ACT8. In ACT8, the processor 51 controls the wireless device 54 to transmit a purchase registration command to the virtual POS server 30. Through this control, the wireless device 54 wirelessly transmits a purchase registration command. The purchase registration command is received at the access point 60 and transmitted to the virtual POS server 30 via the network 2. The purchase registration command includes the member ID stored in the main memory 52 and the commodity code of the commodity to be registered and purchased.

Figure 11:
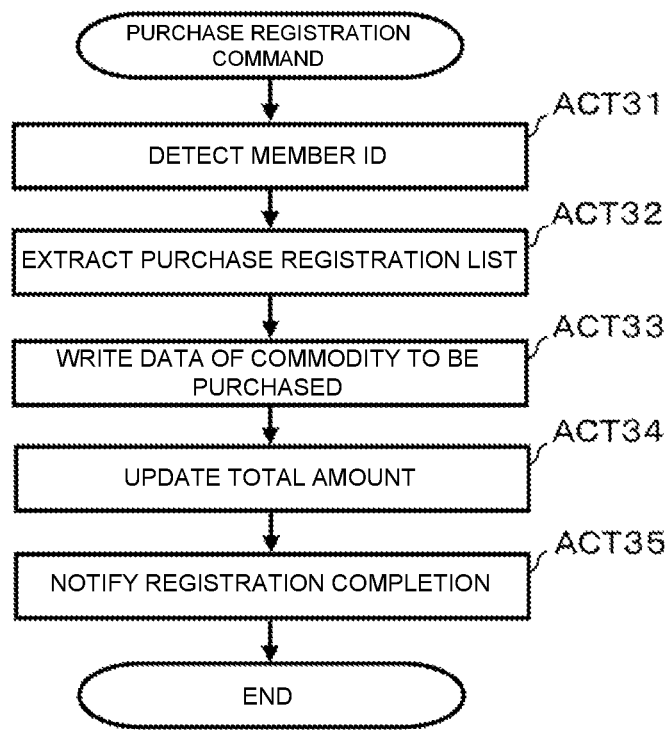
FIG. 11 is a flowchart showing information processing performed by the processor of the virtual POS server according to the embodiment.

The processor 31 of the virtual POS server 30 receives the purchase registration command from the mobile terminal 50 and then starts purchase registration command reception processing shown in the flowchart of FIG. 11. In ACT31, the processor 31 detects the member ID from the purchase registration command. In ACT32, the processor 31 then extracts the purchase registration list 321 (see FIG. 5), in which the member ID is described, from the main memory 32.

After completing the processing in ACT31 and ACT32, the processor 31 creates, in ACT33, the data of the commodity to be purchased on the basis of the commodity code included in the purchase registration command. As described above, the data of the commodity to be purchased includes a commodity code, a commodity name, a price, a purchase count, a purchase amount, and the like of the commodity to be purchased by the user. The processor 31 writes the created data of the commodity to be purchased in the purchase registration list 321. In ACT34, the processor 31 also updates the total amount of the purchase registration list 321 (see FIG. 5) to the amount obtained by adding the purchase amount of the newly written data of the commodity to be purchased.

In ACT35, the processor 31 controls the communication interface 34 to notify the mobile terminal 50 of the registered commodity to be purchased. Through this control, the communication interface 34 transmits a registration completion command to notify that the commodity to be purchased is registered. The registration completion command is wirelessly transmitted from the access point 60 via the network 2 and received by the mobile terminal 50 that is the transmission source of the purchase registration command. Thus, the processor 31 terminates the purchase registration command reception processing.

Now, the description of FIG. 8 will be continued. The processor 51 of the mobile terminal 50 controls the transmission of the purchase registration command in ACT8 described above and then determines whether the registration completion command has been received or not from the virtual POS server 30 in ACT9. If it is determined that the registration completion command has been received (YES in ACT9), the processing of the processor 51 proceeds to ACT10.

In ACT10, the processor 51 updates the purchase registration screen SC1 (see FIG. 18). That is, the processor 51 updates the purchase registration screen SC1 such that the commodity name and the purchase amount of the registered commodity to be purchased are added and the purchase amount is added to the total amount. The processing of the processor 51 that has updated the purchase registration screen SC1 returns to ACT7. When determining that the purchase registration has been performed again in the standby state of ACT7, the processor 51 executes the processing of ACT8 to ACT10 in the similar manner as described above. Therefore, also in the virtual POS server 30, the processor 31 executes the purchase registration command reception processing shown in FIG. 11 again.

If it is determined that the purchase registration is not performed (NO in ACT7), the processing of the processor 51 proceeds to ACT11. The processor 51 determines whether the checkout is instructed or not in ACT11.

The image of the checkout button BT1 is displayed on a part of the purchase registration screen SC1. The user who has finished the purchase touches the checkout button BT1. When the checkout button BT1 is touched, the processor 51 determines that the checkout has been instructed. If the processor 51 determines that the checkout is not instructed (NO in ACT11), the processing of the processor 51 returns to ACT7.

If it is determined that the checkout is instructed (YES in ACT11), the processing of the processor 51 proceeds to ACT12 of FIG. 9.

In ACT12, the processor 51 controls the wireless device 54 to transmit a checkout confirmation command to the virtual POS server 30. Through this control, the wireless device 54 wirelessly transmits the checkout confirmation command. The checkout confirmation command is received at the access point 60 and transmitted to the virtual POS server 30 via the network 2. The checkout confirmation command includes the member ID stored in the main memory 52 of the mobile terminal 50.

Figure 12:
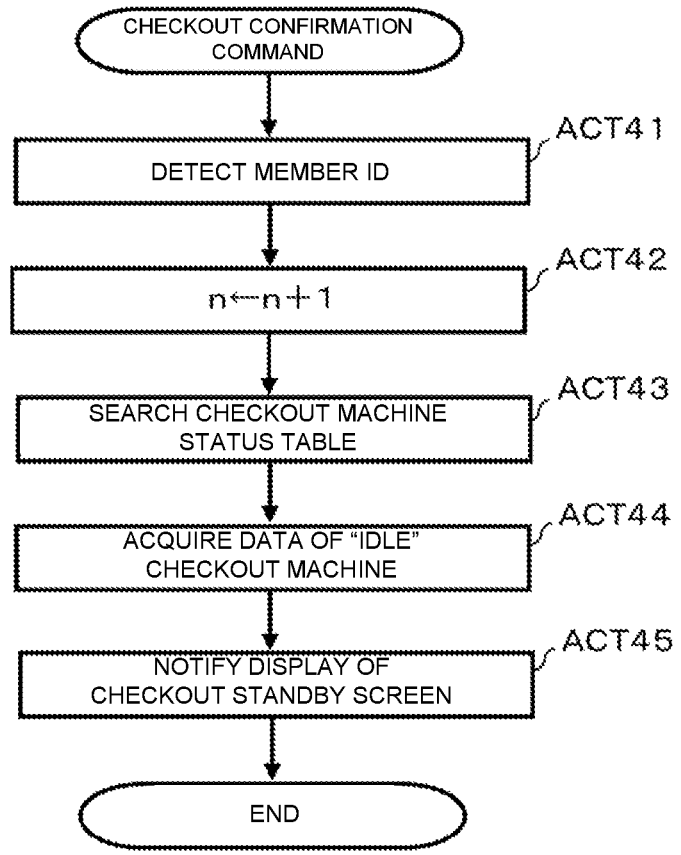
FIG. 12 is a flowchart showing information processing performed by the processor of the virtual POS server according to the embodiment.

The processor 31 of the virtual POS server 30 receives the checkout confirmation command from the mobile terminal 50 and then starts checkout confirmation command reception processing shown in the flowchart of FIG. 12. In ACT41, the processor 31 detects the member ID from the checkout confirmation command. In ACT42, the processor 31 counts up a count value n of the counter 332 of the auxiliary storage device 33 by "1". The counter 332 counts the number of users waiting for checkout. The count value n has the initial value of "0". The count value n is reset before the store opens, for example, and set to the initial value "0".

In ACT43, the processor 31 searches the checkout machine status table 331 (see FIG. 6) of the auxiliary storage device 33. In ACT44, the processor 31 acquires data of the checkout machine 40 whose status is "idle" in the checkout machine status table 331.

In ACT45, the processor 31 controls the communication interface 34 to display the checkout standby screen SC2 (see FIG. 19) on the mobile terminal 50. Through this control, the communication interface 34 transmits a checkout standby command for notifying the display of the checkout standby screen SC2. The checkout standby command is wirelessly transmitted from the access point 60 via the network 2 and is received by the mobile terminal 50 that is the transmission source of the checkout confirmation command. The checkout standby command includes the count value n (the number of users waiting for checkout), and the number of "idle" checkout machines 40 (the number of available checkout machines 40) calculated on the basis of the data of the checkout machine 40 acquired in ACT44. The processor 31 notifies the display of the checkout standby screen SC2 and then terminates the checkout confirmation command reception processing.

Now, the description of FIG. 9 will be continued. The processor 51 of the mobile terminal 50 controls the transmission of the checkout confirmation command in ACT12 described above and then determines whether the checkout standby command has been received or not from the virtual POS server 30 in ACT13. If it is determined that the checkout standby command has been received (YES in ACT13), the processing of the processor 51 proceeds to ACT14. In ACT14, the processor 51 causes the touch panel 55 to display the checkout standby screen SC2.

Figure 19:
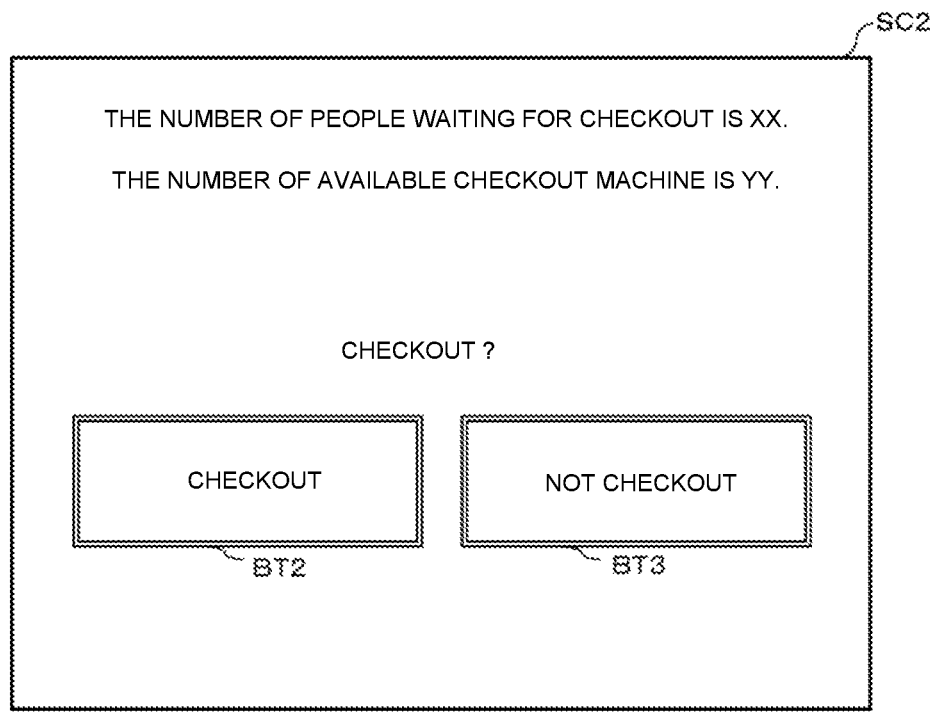
FIG. 19 is a diagram schematically showing an example of a checkout standby screen displayed on the mobile terminal according to the embodiment.

FIG. 19 is a diagram schematically showing an example of the checkout standby screen SC2. As shown in FIG. 19, a message for notifying the number of people waiting for checkout and the number of available checkout machines is displayed on the checkout standby screen SC2. Also, images of a "checkout" button BT2 and a "not checkout" button BT3 are displayed on the checkout standby screen SC2.

The user confirms the checkout standby screen SC2 and performs checkout by touching the "checkout" button BT2. A user who does not perform checkout touches the "not checkout" button BT3.

Now, the description of FIG. 9 will be continued. In ACT15, the processor 51 waits until the "checkout" button BT2 is touched or the "not checkout" button BT3 is touched. If it is determined that the "not checkout" button BT3 is touched (NO in ACT15), the processing of the processor 51 proceeds to ACT16. In ACT16, the processor 51 controls the wireless device 54 to transmit a checkout non-execution command to the virtual POS server 30. Through this control, the wireless device 54 wirelessly transmits the checkout non-execution command. The checkout non-execution command is received at the access point 60 and transmitted to the virtual POS server 30 via the network 2. The checkout non-execution command includes the member ID stored in the main memory 52.

Figure 13:
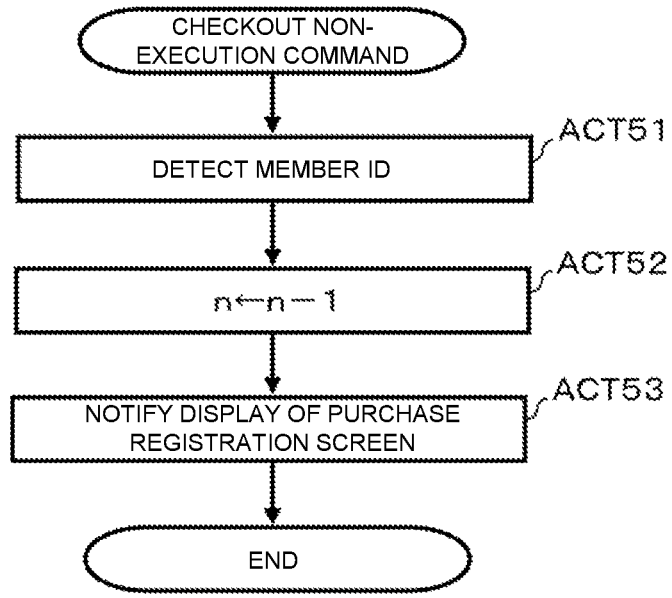
FIG. 13 is a flowchart showing information processing performed by the processor of the virtual POS server according to the embodiment.

The processor 31 of the virtual POS server 30 receives the checkout non-execution command and then starts command reception processing shown in the flowchart of FIG. 13. In ACT51, the processor 31 detects the member D from the checkout non-execution command. In ACT52, the processor 31 counts down the count value n of the counter 332 by "1".

In ACT53, the processor 31 controls the communication interface 34 to display the purchase registration screen SC1 on the mobile terminal 50. Through this control, the communication interface 34 transmits a display command for notifying the display of the purchase registration screen SC1. The display command is wirelessly transmitted from the access point 60 via the network 2 and received by the mobile terminal 50 that is the transmission source of the checkout non-execution command. The processor 31 notifies the display of the purchase registration screen SC1 and then terminates the checkout non-execution command reception processing.

Now, the description of FIG. 9 will be continued. The processor 51 of the mobile terminal 50 controls the transmission of the checkout non-execution command in ACT16 described above and then determines whether the display command is received or not from the virtual POS server 30 in ACT17. If it is determined that the display command has been received (YES in ACT17), the processing of the processor 51 returns to ACT6 of FIG. 8. Thus, the user can perform a purchase registration again.

Now, the processor 51 recognizes that the checkout execution is instructed when it is determined that the "checkout" button BT2 has been touched. If it is determined that the "checkout" button BT2 has been touched (YES in ACT15), the processing of the processor 51 proceeds to ACT18. In ACT18, the processor 51 controls the wireless device 54 to transmit a checkout execution command to the virtual POS server 30. Through this control, the wireless device 54 wirelessly transmits the checkout execution command. The checkout execution command is received at the access point 60 and transmitted to the virtual POS server 30 via the network 2. The checkout execution command includes the member ID stored in the main memory 52.

Figure 14:
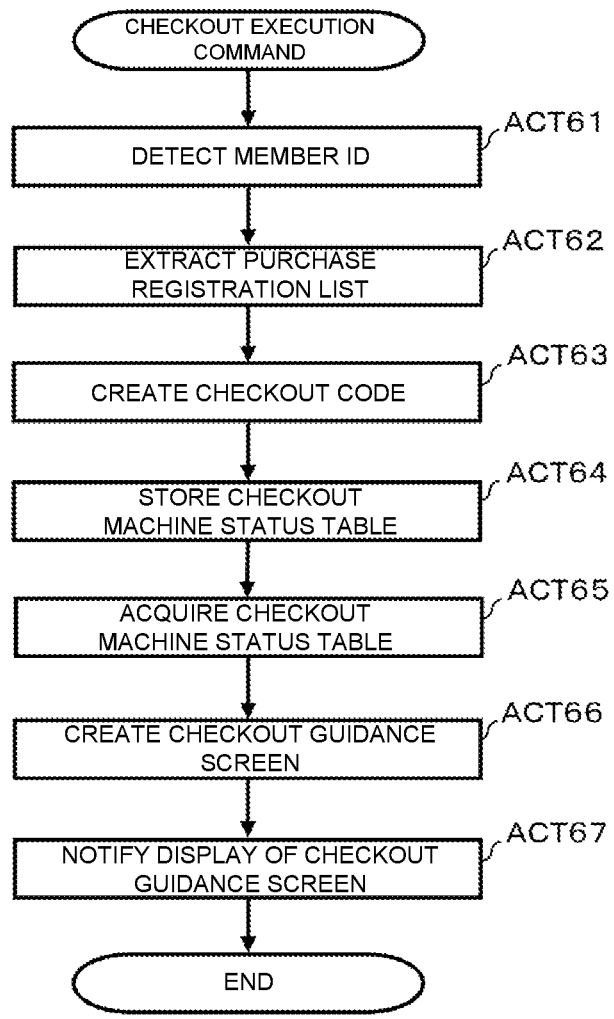
FIG. 14 is a flowchart showing information processing performed by the processor of the virtual POS server according to the embodiment.
Figure 15:
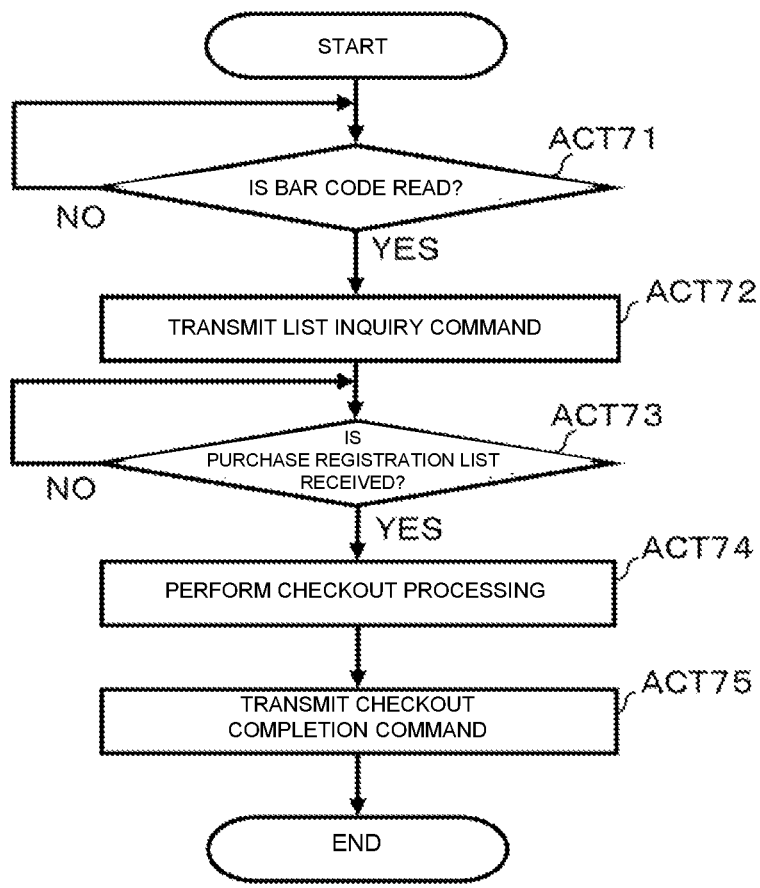
FIG. 15 is a flowchart showing information processing performed by a processor of the checkout machine according to the embodiment.

The processor 31 of the virtual POS server 30 receives the checkout execution command from the mobile terminal 50 and then starts checkout execution command reception processing shown in the flowchart of FIG. 14. In ACT61, the processor 31 detects the member ID from the checkout execution command. In ACT62, the processor 31 extracts the purchase registration list 321, in which the member ID is described, from the main memory 32.

After completing the processing of ACT61 and ACT62, the processor 31 generates data of a checkout code in ACT63. The checkout code is used to identify a user who performs checkout in the checkout machine 40. The checkout code is generated for each user who performs checkout in the checkout machine 40. In ACT64, the processor 31 stores the checkout code in the purchase registration list 321.

In ACT65, the processor 31 acquires the checkout machine status table 331 from the auxiliary storage device 33. The processor 31 creates a checkout guidance screen SC3 (see FIG. 20) on the basis of the acquired checkout machine status table 331. The checkout guidance screen SC3 also includes a checkout bar code indicating the checkout code generated in ACT63.

Figure 20:
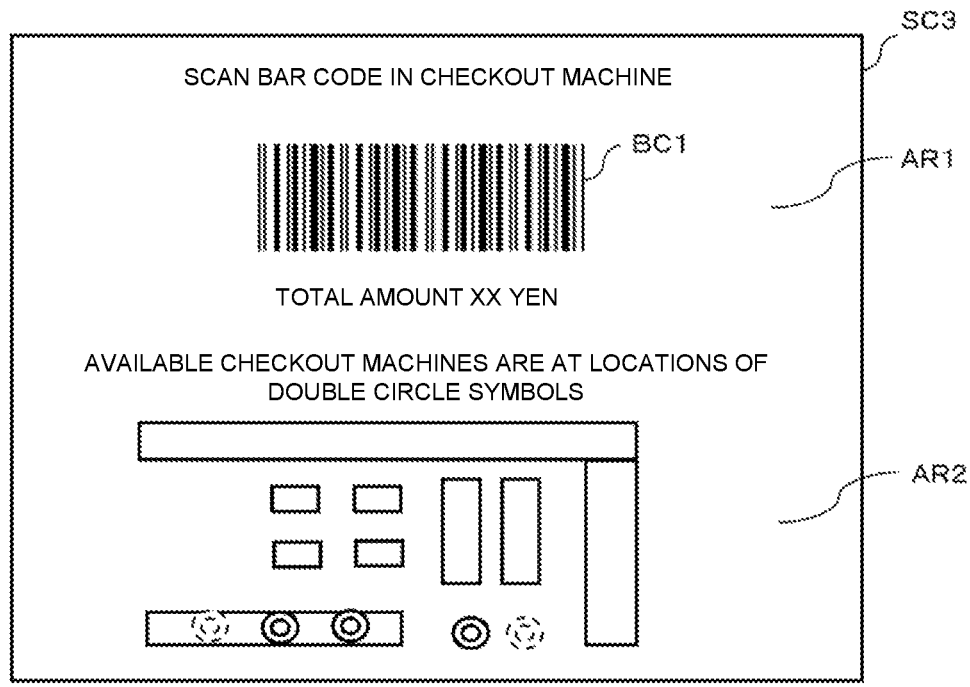
FIG. 20 is a diagram schematically showing an example of a checkout guidance screen displayed on the mobile terminal according to the embodiment.

FIG. 20 is a diagram schematically showing an example of the checkout guidance screen SC3. As shown in FIG. 20, the checkout guidance screen SC3 displays a display area AR1 for the checkout bar code and a display area AR2 for a checkout guidance image. In the display area AR1, a checkout bar code BC1, the total amount of the registered commodities to be purchased, and a message prompting the user to scan the checkout bar code in the checkout machine 40 are displayed.

In the display area AR2, an in-store map is displayed together with a message indicating the installation locations of the available checkout machines 40. The in-store map is created on the basis of the checkout machine status table 331 (see FIG. 6). The installation location of the checkout machine 40 whose status is "idle" in the checkout machine status table 331, that is, the checkout machine 40 available to the user at this time, is displayed by a double circle of a solid line. The installation location of the checkout machine 40 whose status is "in checkout" in the checkout machine status table 331, that is, the unavailable checkout machine 40, is displayed by a double circle of a dotted line. Note that the details of the message and the in-store map displayed on the checkout guidance screen SC3 in FIG. 20 are examples. The details of the message and the in-store map displayed on the checkout guidance screen SC3 may be any information that notifies the user of the checkout bar code and guides the user to an available checkout machine.

Now, the description of FIG. 14 will be continued. In ACT67, the processor 31 controls the communication interface 34 to display the checkout guidance screen SC3 on the mobile terminal 50. Through this control, the communication interface 34 transmits a checkout guidance command for notifying the display of the checkout guidance screen SC3. The checkout guidance command is wirelessly transmitted from the access point 60 via the network 2 and received by the mobile terminal 50 that is the transmission source of the checkout execution command. The processor 31 notifies the display of the checkout guidance screen SC3 and then terminates the checkout execution command reception processing.

Now, the description of FIG. 9 will be continued. The processor 51 of the mobile terminal 50 controls the transmission of the checkout execution command in ACT18 described above and then waits for the checkout guidance command from the virtual POS server 30 in ACT19. If it is determined that the checkout guidance command has been received from the virtual POS server 30 (YES in ACT19), the processing of the processor 51 proceeds to ACT20. In ACT20, the processor 51 causes the touch panel 55 to display the checkout guidance screen SC3.

The processor 51 of the mobile terminal 50 causes the touch panel 55 to display the checkout guidance screen SC3 in ACT20 described above and then terminates the information processing shown in the flowcharts of FIGS. 8 and 9.

If it is determined that checkout is not instructed (NO in ACT11), the processor 51 returns to the processing of ACT7 and executes processing of ACT7 to ACT20 as in the case described above. If it is determined that the display command has been received (YES in ACT17), the processor 51 returns to the processing of ACT6 and then executes processing of ACT6 to ACT20 as in the case described above. Thus, also in the virtual POS server 30, the processor 31 executes the command reception processing shown in FIGS. 11 to 13 or 11, 12, and 14 again.

After confirming the checkout guidance screen SC3, the user goes to the installation location of the available checkout machine 40 and causes the scanner 418 of the checkout machine 40 to read the checkout bar code displayed on the checkout guidance screen SC3.

In ACT71 of FIG. 15, the processor 411 of the checkout machine 40 determines whether the checkout bar code has been read or not. If it is determined that the checkout bar code has been read (YES in ACT71), the processing of the processor 411 proceeds to ACT72.

In ACT72, the processor 411 controls the communication interface 416 to transmit a list inquiry command to the virtual POS server 30. Through this control, the communication interface 416 transmits a list inquiry command. The list inquiry command is wirelessly transmitted from the access point 60 via the network 2 and received by the virtual POS server 30. The list inquiry command includes the checkout code obtained by analyzing the checkout bar code, and the checkout machine number of the checkout machine 40 that has read the checkout bar code.

Figure 16:
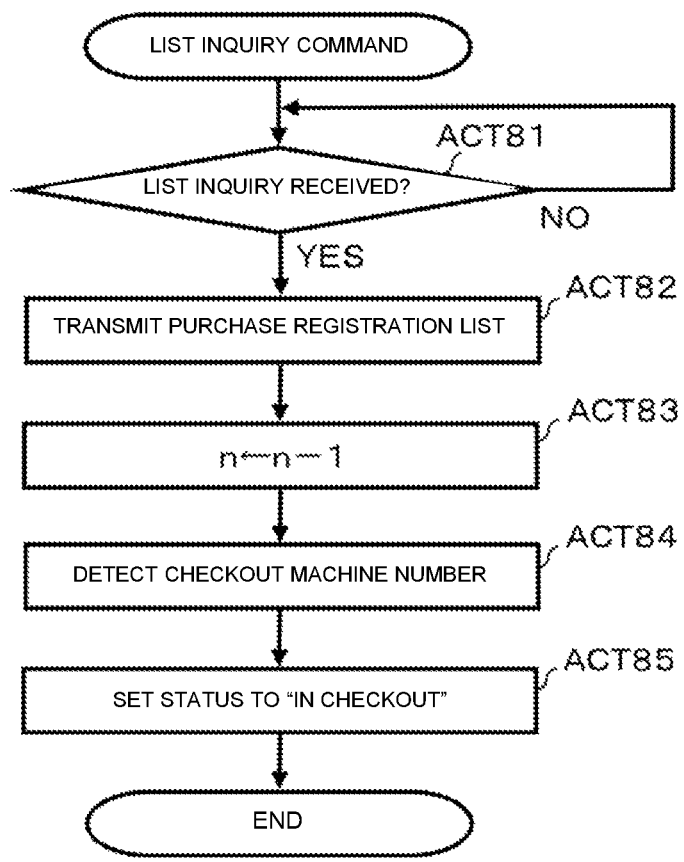
FIG. 16 is a flowchart showing information processing performed by the processor of the virtual POS server according to the embodiment.

The processor 31 of the virtual POS server 30 receives the list inquiry command from the checkout machine 40 and then starts list inquiry command reception processing shown in the flowchart of FIG. 16. In ACT81, the processor 31 determines whether or not there has been an inquiry for the purchase registration list 321. If it is determined that there has been an inquiry for the purchase registration list 321 (YES in ACT81), the processing of the processor 31 proceeds to ACT82.

In ACT82, the processor 31 controls the communication interface 34 transmit to the data of the purchase registration list 321, in which the checkout code included in the list inquiry command is registered, to the checkout machine 40. Through this control, the communication interface 34 transmits the data of the purchase registration list 321. The data of the purchase registration list 321 is wirelessly transmitted from the access point 60 via the network 2 and received by the checkout machine 40.

In ACT83, the processor 31 counts down the count value n (the number of users waiting for checkout) of the counter 332 by "1".

In ACT84, the processor 31 searches the checkout machine status table 331 (see FIG. 6) of the auxiliary storage device 33 and detects the checkout machine number included in the list inquiry command from the checkout machine 40. In ACT85, the processor 31 sets the status corresponding to the checkout machine number to "in checkout" and terminates the list inquiry command reception processing.

Now, the description of FIG. 15 will be continued. The processor 411 of the checkout machine 40 controls the transmission of the list inquiry command in ACT72 described above and then determines whether the purchase registration list 321 has been received or not from the virtual POS server 30 in ACT73. If it is determined that the purchase registration list 321 has been received (YES in ACT73), the processing of the processor 411 proceeds to ACT74.

In ACT74, the processor 411 executes checkout processing on the basis of the data of the purchase registration list 321. Since this checkout processing is well-known processing, detailed description thereof will be omitted.

In ACT75, the processor 411 controls the communication interface 416 to transmit a checkout completion command to the virtual POS server 30. Through this control, the communication interface 416 transmits the checkout completion command. The checkout completion command is wirelessly transmitted from the access point 60 via the network 2 and received by the virtual POS 30. The checkout completion command includes the checkout machine number of the checkout machine 40 that has read the checkout bar code and executed the checkout processing. Thus, the processor 411 terminates the information processing shown in the flowchart of FIG. 15.

Figure 17:
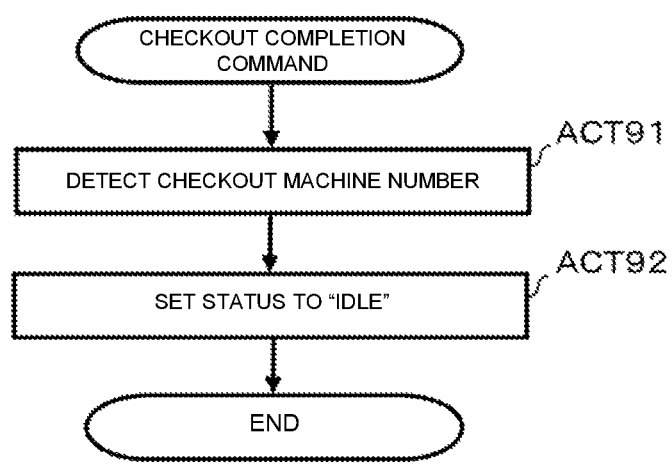
FIG. 17 is a flowchart showing information processing performed by the processor of the virtual POS server according to the embodiment.

The processor 31 of the virtual POS server 30 receives the checkout completion command and then starts checkout completion command reception processing shown in the flowchart of FIG. 17. In ACT91, the processor 31 searches the checkout machine status table 331 to detect the checkout machine number included in the checkout completion command. In ACT92, the processor 31 sets the status corresponding to the checkout machine number to "idle" and terminates the checkout completion command reception processing.

As apparent from the above description, the virtual POS server 30, which is an example of the information processing apparatus, constitutes the registration means by the processor 31 executing the processing of ACT31 to ACT34 of FIG. 11. That is, when the identification information of the commodity to be purchased is input through the mobile terminal 50, the virtual POS server 30 registers the data of the commodity to be purchased, which is identified by such identification information, in the list, that is, in the purchase registration list 321.

The virtual POS server 30 constitutes the notification means by the processor 31 executing the processing of ACT61 to ACT67 of FIG. 14. That is, upon receiving an instruction of checkout from the mobile terminal 50, the virtual POS server 30 notifies the mobile terminal 50 of the code for specifying the purchase registration list 321, that is, the checkout code.

The virtual POS server 30 also constitutes the output means by the processor 31 executing the processing of ACT81 and ACT82 of FIG. 16. That is, upon inputting the checkout code in the checkout machine 40, the virtual POS server 30 outputs the purchase registration list 321 specified by the checkout code to the checkout machine 40.

The virtual POS server 30 constitutes the counting means by the processor 31 executing the processing of ACT41 and ACT42 of FIG. 12 and ACT81 to ACT83 in cooperation with the counter 332. That is, the virtual POS server 30 counts the number of checkout codes that have been notified to the mobile terminal 50 but have not been input in the checkout machine 40.

Further, the virtual POS server 30 constitutes the processing means by the processor 31 executing the processing of ACT45 of FIG. 12. That is, the virtual POS server 30 executes processing for notifying the user of the mobile terminal 50 of the number counted by the counting means.

Therefore, using the store system 1 including such an information processing apparatus, the user can know in advance the number of people waiting for checkout. Further, a message for notifying the number of available checkout machines 40 is displayed on the checkout standby screen SC2 together with the number of people waiting for checkout. Therefore, the user can know in advance the number of available checkout machines 40. After confirming the message, the user can select and press the "checkout" button BT2 or the "not checkout" button BT3. That is, the user can know in advance the congestion state of waiting for checkout and then select whether to perform checkout or continue the purchase registration, which is efficient.

Further, the checkout guidance screen SC3 displays the installation location of the available checkout machine 40. Therefore, the user can know in advance the installation location of the available checkout machine 40, which is efficient.

As described above, the embodiment of the information processing apparatus, the store system, and the information processing method has been described, but embodiments are not limited thereto.

The above embodiment has described the count-up of the counter 332 in the processing of the checkout confirmation command. This processing is not necessarily the processing of the checkout confirmation command. For example, this processing may be in the processing of the checkout execution command. In this case, the processing of ACT52 of FIG. 13 is not necessary.

The above embodiment has exemplified the case where the mobile terminal 50 is attached to the cart C. The mobile terminal 50 is not necessarily attached to the cart C. For example, the mobile terminal 50 may be a smartphone, a tablet terminal, or the like owned by the user.

The above embodiment has described the virtual POS server 30 as an aspect of the information processing apparatus. The virtual POS server 30 is not limited to the one described in the above embodiment. For example, the virtual POS server 30 further having the function of at least one of the store server 10 or the member server 20 may be used as the information processing apparatus. In other words, the store server 10 or the member server 20 having the function of the virtual POS server 30 may be used as the information processing apparatus.

The above embodiment has described the processing means as means for executing processing for notification to the user of the mobile terminal 50. The processing means may exclude the mobile terminal 50 from notification targets. For example, the processing means may execute the processing with a monitor installed in at least one location in the store being used as a notification target. Therefore, the user of the mobile terminal 50 can know the number of people waiting for checkout from the information notified to the monitor.

The above embodiment has exemplified the case where the code for specifying the purchase registration list 321 is the checkout code. The code for specifying the purchase registration list 321 is not limited to the checkout code. For example, the code for identifying the purchase registration list 321 may be the member ID.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A store system comprising:
an information processing apparatus connected to a network;
a plurality of shopping carts on a physical store floor, each of which is coupled to a code scanner and a mobile terminal mounted thereon, the mobile terminal configured to:
perform registration processing of registering identification information of a commodity to be purchased, which is obtained by scanning of a commodity code by the code scanner from the commodity handled by a user, wherein the registration processing includes wireless transmission of a purchase registration command for instructing registration of data of the commodity to be purchased from the mobile terminal, the purchase registration command including the identification information of the commodity to be purchased and identification information of the user; and
wirelessly transmit a checkout execution command for instructing execution of checkout for the commodity to be purchased; and
a plurality of checkout machines set in the physical store floor, each of the checkout machines being capable of performing checkout processing for the registered commodity to be purchased, wherein the checkout processing includes transmission of a list inquiry command,
the information processing apparatus comprising:
a communication interface that communicates with the mobile terminal on each of the shopping carts and the plurality of checkout machines via the network;
a memory that stores a purchase registration list including data of the commodity to be purchased identified by the identification information, the data being registered for each user;
a storage device including a counter that stores a count value of the number of users waiting for the checkout processing; and
a processor that
registers, upon receiving the identification information of the commodity to be purchased included in the purchase registration command, from the mobile terminal on one of the shopping carts via the communication interface, the data of the commodity to be purchased identified by the received identification information in the purchase registration list of the user of the mobile terminal on the one of the shopping carts, which is a transmission source of the identification information,
notifies, upon receiving the checkout execution command for instructing execution of checkout for the commodity to be purchased from the mobile terminal on the one of the shopping carts via the communication interface, the mobile terminal on the one of the shopping carts of a checkout code for specifying the purchase registration list of the user of the mobile terminal on the one of the shopping carts, which is the transmission source of the checkout execution command, outputs, upon receiving the list inquiry command, which includes the checkout code, from one of the checkout machines to which the checkout code is input via the mobile terminal that has been notified of the checkout code, the purchase registration list specified by the checkout code included in the list inquiry command to the checkout machine that is the transmission source of the list inquiry command, counts the number of checkout codes that are notified to mobile terminals on the shopping carts but not received from the checkout machines with counting up the count value of the counter when receiving a checkout confirmation command for confirming the checkout for the commodity to be purchased from the mobile terminal on one of the shopping carts that has been notified of the checkout code and by counting down the count value of the counter when receiving the list inquiry command including the checkout code from the one of the checkout machines in which the checkout code is input via the mobile terminal on the one of the shopping carts and stores the count value in the counter of the storage device, and transmits the count value of the counter to the mobile terminal on the one of the shopping carts via the communication interface and causes the mobile terminal on the one of the shopping carts to display the count value.

2. The store system according to claim 1, wherein the processor receives the purchase registration command via the communication interface, detects the identification information of the user from the purchase registration command, and registers, in the purchase registration list, the data of the commodity to be purchased identified by the identification information included in the purchase registration command for each piece of the detected identification information of the user.

3. The store system according to claim 2, wherein the processor counts up the count value of the counter upon detecting the identification information of the user from the checkout confirmation command.

4. The store system according to claim 2, wherein the storage device further includes a checkout machine status table that stores checkout machine information on whether each of the plurality of checkout machines is available or not, and the processor searches the checkout machine status table and determines whether each of the plurality of checkout machines is available or not, and transmits the number of available checkout machines to the mobile terminal on the one of the shopping carts together with the count value of the counter.

5. The store system according to claim 4, wherein the processor transmits a checkout standby command such that the mobile terminal on the one of the shopping carts displays a checkout standby screen for receiving an input of the user to select whether to execute the checkout for the commodity to be purchased, and the checkout standby screen includes display of the count value of the counter and the number of available checkout machines.

6. The store system according to claim 5, wherein upon receiving the checkout execution command from the mobile terminal on the one of the shopping carts, that receives the input to select execution of the checkout for the commodity to be purchased via the checkout standby screen, the processor creates data of a checkout guidance screen for guiding the user to a location of an available checkout machine, and transmits the data of the checkout guidance screen to the mobile terminal on the one of the shopping carts via the communication interface such that the checkout guidance screen is displayed on the mobile terminal on the one of the shopping carts.

7. The store system according to claim 6, wherein upon receiving the checkout execution command from the mobile terminal on the one of the shopping carts, that receives the input to select execution of the checkout for the commodity to be purchased via the checkout standby screen, the processor creates the checkout code and registers the checkout code in the purchase registration list, and creates the data of the checkout guidance screen including the created checkout code.

8. The store system according to claim 7, wherein the list inquiry command includes the checkout code and identification information of the checkout machine that is a transmission source of the list inquiry command, the checkout machine status table of the storage device further stores the checkout machine information on whether each of the plurality of checkout machines is available or not, for each identification information of the checkout machine, and the processor transmits, upon receiving the list inquiry command via the communication interface, the purchase registration list to the checkout machine that is the transmission source of the list inquiry command, the checkout code included in the received list inquiry command being registered in the purchase registration list, and rewrites, after transmitting the purchase registration list to the checkout machine that is the transmission source of the list inquiry command, checkout machine information corresponding to the identification information of the checkout machine included in the received list inquiry command into information indicating an unavailable status in the checkout machine status table.

9. The store system according to claim 1, wherein each of the plurality of checkout machines includes a second communication interface that communicates with the mobile terminal on each of the shopping carts and the information processing apparatus, an input device that inputs obtains the checkout code by using from the mobile terminal on the one of the shopping carts, the checkout code being transmitted from the information processing apparatus to the mobile terminal on the one of the shopping carts, and a second processor that transmits, upon input of the checkout code from the input device, the list inquiry command to the information processing apparatus via the second communication interface, receives, after transmitting the list inquiry command, the purchase registration list from the information processing apparatus via the second communication interface, and executes the checkout processing on a basis of the received purchase registration list.

10. The store system according to claim 1, wherein in each of the shopping carts, the code scanner and the mobile terminal are directable in a rearward direction of the shopping cart.

\* \* \* \* \*